United States Patent [19]

Knight et al.

[11] 3,872,923

[45] Mar. 25, 1975

[54] USE OF RADIATION-INDUCED POLYMERS AS TEMPORARY OR PERMANENT DIVERTING AGENT

[75] Inventors: Bruce L. Knight; John S. Rhudy; William B. Gogarty, all of Littleton, Colo.

[73] Assignee: ICI United States Inc., Wilmington, Del.

[22] Filed: Nov. 6, 1972

[21] Appl. No.: 303,737

[52] U.S. Cl.................. 166/247, 166/295, 166/307
[51] Int. Cl...................... E21b 33/138, E21b 43/27
[58] Field of Search .......... 166/295, 275, 274, 271, 166/307, 305 R, 247

[56] References Cited
UNITED STATES PATENTS

| | | | |
|---|---|---|---|
| 2,827,964 | 3/1958 | Sandiford | 166/274 |
| 3,039,529 | 6/1962 | McKennon | 166/275 |
| 3,070,158 | 12/1962 | Roper et al. | 166/275 |
| 3,114,419 | 12/1963 | Perry et al. | 166/295 X |
| 3,336,979 | 8/1967 | Ingraham et al. | 166/283 |
| 3,400,761 | 9/1968 | Latimer, Jr. et al. | 166/274 |

FOREIGN PATENTS OR APPLICATIONS

| | | | |
|---|---|---|---|
| 683,476 | 3/1964 | Canada | 166/275 |

*Primary Examiner*—Stephen J. Novosad
*Attorney, Agent, or Firm*—Joseph C. Herring; Richard C. Willson, Jr.; Jack L. Hummel

[57] ABSTRACT

Temporary or permanent permeability reduction or plugging of porous medium to the flow of fluids is effected by treating, preferably by injecting under pressure into the pores, the porous medium with an aqueous solution containing a water-soluble polymer obtained as a product of radiation-induced polymerization of acrylamide and/or methacrylamide and acrylic acid, methacrylic acid, and/or alkali metal salts thereof. The polymer has sufficient properties to effect substantial permeability reduction of the porous medium. The polymerization is preferably carried out in 10–60 percent aqueous monomer solution with gamma radiation. A mixture of monomers, before radiation, preferably contain 25–99 percent acrylamide and 75–1 percent sodium acrylate. Permeability can be restored by subsequently treating the porous medium with a chemical to break down the polymer, e.g., hydrazine hypochlorite solution, strong mineral acids, or bases.

21 Claims, No Drawings

3,872,923

USE OF RADIATION-INDUCED POLYMERS AS TEMPORARY OR PERMANENT DIVERTING AGENT

CROSS REFERENCE TO RELATED APPLICATIONS

The following patent applications relate to the general field of this invention:
Ser. No. 303,735, filed Nov. 6, 1972;
Ser. No. 303,743, filed Nov. 6, 1972;
Ser. No. 302,448, filed Oct. 31, 1972, now abandoned;
Ser. No. 303,744, filed Nov. 6, 1972;
and application titled: "Process of Recovering Hydrocarbon using Polymer Obtained Radiation Polymerization", Ser. No. 303,739, filed Nov. 6, 1972.

BACKGROUND OF THE INVENTION

1. Field of the Invention.

This invention relates to temporarily or permanently blocking a permeable subterranean strata in a reservoir by injecting into the reservoir through an injection means an aqueous polymer solution. Also, the invention can be used to temporarily or permanently "plug" any porous medium, including surface areas.

2. Description of the Prior Art.

It is known that certain water-soluble high molecular weight polymers reduce the permeability of porous media, including reservoir rock. Examples of patents which teach this are U.S. Pat. No. 2,341,500 to Detling; U.S. Pat. No. 2,771,138 to Beeson; U.S. Pat. No. 2,842,492 to Engelhardt et al; U.S. Pat. No. 3,002,960 to Kolodny; and U.S. Pat. No. 3,020,953 to Zerweck et al. The above patents teach that high molecular weight polymers give improved mobility control to a waterflooding process.

Partially hydrolyzed, high molecular weight polyacrylamides are known to be useful to reduce the permeability of porous media. These polyacrylamides are defined in U.S. Pat. No. 2,827,964 to Sandiford et al and U.S. Pat. No. 3,039,529 to McKennon. The polyacrylamide that is to be hydrolyzed can contain up to 10 percent by weight of a polymerizable vinyl compound. The original carboxy-amide groups within the polyacrylamide are hydrolyzed to carboxyl groups, e.g., from about 0.8 to about 67 percent of the amide groups are hydrolyzed.

U.S. Pat. No. 3,400,761, to Latimer, Jr. et al., teaches blocking the fluid flow between a reservoir and a second reservoir by injecting between the reservoirs an aqueous solution of a water-soluble, hydrolyzed polyacrylamide. These polyacrylamides can be the ones defined in the above patent to McKennon.

U.S. Pat. No. 3,417,821, to Tinsley et al., teaches an improved fracturing process by injecting into the formation a fracturing fluid containing a concentration of disk-like elastic members which are thicker at the center than at the periphery. The prior art has also taught that subterranean strata can be plugged by reacting in situ to form precipitates which obstruct the flow of fluids; examples of patents include U.S. Pat Nos. 2,272,672; 2,238,930; 2,747,670; 2,807,324; 3,342,262; and 3,530,937.

Also, it is known that copolymers such as those defined in U.S. Pat. No. 3,025,237 and 3,070,158 to Roper are useful to reduce the permeability of subterranean strata. These patents teach that copolymers of acrylamide-acrylic acid are useful to improve waterflooding.

SUMMARY OF THE INVENTION

Applicants have discovered an improved polymer for temporarily or permanently "plugging" a porous medium, the polymer obtained by radiation polymerization of acrylamide and/or methacrylamide and acrylic acid, methacrylic acid, and/or alkali metal salts thereof. The aqueous solution to be polymerized may contain about 10-60 percent by weight of monomer. A preferred mixture of monomers contains 25-99 percent acrylamide and 75-1 percent by weight, based on the total weight of monomer, of sodium acrylate. Radiation intensity is about 250 to about 1,000,000 rads/hr., and the dosage is about 500 to about 300,000 rads. An aqueous solution of the polymer can be injected into a porous medium followed by a complexing agent, e.g., chromic chloride, to complex the polymer molecules and increase the "blocking" efficiency of the polymer. Also, an aqueous hydrazine or hypochlorite solution can be injected or used to treat the porous medium after the aqueous polymer solution to restore at least a portion of the permeability of the porous medium.

PREFERRED EMBODIMENTS OF THE INVENTION

The monomer is a combination of at least one compound selected from the group consisting of acrylamide and methacrylamide and at least one compound selected from the group consisting of acrylic acid, methacrylic acid, alkali metal acrylate, and alkali metal methacrylate. Minor amounts of additional ethylenically unsaturated monomers which are copolymerizable are useful. Preferably, the monomer is a mixture of acrylamide and sodium acrylate. It is preferred that the monomer contain about 1–75 percent and preferably 15–55 percent and more preferably 25–50 percent of acrylic acid or alkali metal salt thereof, e.g., sodium acrylate.

Irradiation of the monomer is preferably carried out in an aqueous solution containing about 10 to about 60 percent and more preferably about 15 to about 45 percent by weight of dissolved monomer. At the lower concentrations of monomer, the product is generally a pourable polymer solution and at concentrations of above about 15 percent by weight, the product is generally a nonpourable gel. A water-insoluble product may result at concentrations above about 60 percent monomer; thus, such high concentrations are undesirable. Of course, the particular limits of monomer concentration will depend, among other things, on the radiation conditions used, monomers used, and on the desired product for a particular use. The intrinsic viscosity of the polymer product increases as the monomer concentration increases, up to the point where the amount of cross-linking becomes appreciable, provided all other variables are kept constant.

The aqueous monomer solution preferably contains not more than about 5 ppm of transition metal ions, such as nickel, iron, and cobalt, and no more than about 0.5 ppm of cuprous and cupric ions.

Irradiation of the aqueous monomer solution may be accomplished with high energy ionizing radiation. Radiation wavelengths below 3500 Angstroms and preferably below 2000 Angstroms are useful. The radiation employed may be particulate or electromagnetic in nature. Examples include accelerated electrons, protons, neutrons, etc., as well as X-rays and gamma-rays, the latter being preferred.

Radiation intensity is preferably about 1,000 to about 300,000 rads/hr. and more preferably about 5,000 to about 200,000 rads/hr. Intensity directly influences the molecular weight of the copolymer. That is, under otherwise identical conditions, low intensities generally give higher molecular weights.

The radiation dose is preferably at least about 1,000 rads and more preferably at least about 1,500 rads. The maximum dose level is preferably not more than 100,000 rads and more preferably not more than 50,000 rads.

The radiation dose used directly influences the intrinsic viscosity and degree of monomer-to-polymer conversion. At a given radiation intensity and monomer concentration, an increase in radiation dose generally tends to result in a decrease in the intrinsic viscosity of the polymer produced and an increase in the degree of monomer-to-polymer conversion. The radiation dose may also influence the water-solubility of the polymer as it has been found that too high a radiation dose may render the resulting polymer water-insoluble. At the preferred dosage rates, conversion up to about 100% and preferably 80-100% of the monomer to polymer may be obtained without undue insolubilization.

The pH of the aqueous monomer solution is generally not critical except that very low pH values may cause insoluble products to form. Preferably the pH is within the range of 3–13 and more preferably about 8 to about 11. Although higher and lower pH values may be used, it should be recognized that hydrolysis may occur at pH values much below about 3 and much above about 11.

While the process described above may be used to prepare polymers having an intrinsic viscosity from about 6 to about 30 dl/g (deciliters per gram) in 2 normal sodium chloride at 25.5°C, the process is modified somewhat to prepare polymers having an intrinsic viscosity below about 6 dl/g or above about 30 dl/g in 2 normal sodium chloride at 25.5°C. Polymers having an intrinsic viscosity below about 6 dl/g are prepared by carrying out the polymerization reaction described above in the presence of a chain transfer agent. The chain transfer agent tends to restrict the growth of active polymer chains and thereby results in the formation of polymers having lower molecular weight (lower intrinsic viscosity). The chain transfer agents which may be used herein may be any chain transfer agent which tends to restrict the growth of the polymer chains and thereby aid the formation of lower molecular weight (lower intrinsic viscosity) polymers, which is soluble in the reaction medium, and which does not interfere with the polymerization by reacting with the monomer. Illustrative examples of chain transfer agents which may be used include lower alkyl alcohols, such as methanol, ethanol, and isopropanol; halogenated compounds, such as trichloroacetic acid; thiosorbitols containing two thio groups and four secondary hydroxyl groups; and mercaptans. The amount of chain transfer agent used depends upon the intrinsic viscosity desired, the monomer concentration, and the chain transfer constant of the chain transfer agent used. The use of a chain transfer agent is not necessary in order to prepare polymers having intrinsic viscosities from about 6 to about 30 dl/g; but if desired, such polymers may be prepared in the presence of chain transfer agents.

In order to prepare polymers having an intrinsic viscosity above about 30 dl/g, the polymerization reaction is terminated when less than about 75 percent and preferably when less than about 60 percent by weight of the monomer has been converted to polymer. It has been found that the intrinsic viscosity of the resulting polymer tends to decrease as the percent conversion of monomer to polymer increases. For reasons of economy, it is not practical to tolerate conversions lower than about 20 percent.

The variables of radiation intensity, total radiation dose, and monomer concentration discussed above are interdependent variables. While useful polymers may be prepared at all monomer concentrations, radiation intensities, and radiation dosages within the ranges given heretofore, all combinations of concentration, dose, and intensity within these ranges may not be used to prepare polymers useful in the process of this invention. For example, while a polymer useful in the process of this invention may be prepared at a monomer concentration of 60 percent by weight, provided the radiation dose used is sufficiently low to result in the formation of water-soluble polymers, the use of a monomer concentration of 60 percent by weight, an intensity of 250 rads per hour, and a dose of 300,000 rads, results in the formation of water-insoluble polymers. In view of this interdependency of intensity, dose, and monomer concentration, it may be necessary to perform a limited amount of experimentation in order to prepare a polymer having the desired intrinsic viscosity. However, this experimentation may be kept to a minimum in view of the disclosure in Table 1 below of the preparation of a variety of polymers of different viscosities and in view of the discussion above on the effect of intensity, dose, monomer concentration, degree of conversion, and chain transfer agent on the intrinsic viscosity of the polymer. Accordingly, the reaction conditions which may be used to prepare a water-soluble polymer having an intrinsic viscosity different from the intrinsic viscosities of the polymers described in Table 1 may be readily determined by minor modification of the reaction conditions given in Table 1 for the preparation of the polymer having the intrinsic viscosity nearest to the intrinsic viscosity of the polymer which is desired to be prepared. Such modification may be made in view of the discussions above on the effect of intensity, dose, monomer concentration, percent conversion of monomer to polymer, and chain transfer agent on the intrinsic viscosity of the polymer. For example, a polymer having an intrinsic viscosity of about 16 dl/g may be prepared by using the same reaction conditions employed in Example F, Table 1, except that the radiation intensity is increased, the total radiation dose is increased, the monomer concentration is lowered, the percent monomer conversion is increased, and/or the reaction is carried out in the presence of a chain transfer agent. It is generally preferred, however, that the said decrease in intrinsic viscosity be obtained by increasing the radiation intensity, lowering the monomer concentration, and/or using a chain transfer agent.

The product of irradiation is an aqueous solution of the water-soluble polymer which may be in the form of a pourable liquid or a nonpourable, rubbery gel, depending upon the polymer concentration and intrinsic viscosity of the polymer. The viscosity of the polymer solution tends to increase as the concentration and intrinsic viscosity of the polymer increase. The polymer solutions produced by the radiation may be admixed with water and used directly or the polymer solution may be concentrated by conventional means or it may be recovered in particulate form, e.g., dry form. For example, a nonpourable gel may be finely subdivided and the water removed from the subdivided gel with a water-miscible, volatile organic liquid, e.g., with methanol, which has no affinity for the copolymer.

The polymer may contain cations which are preferably monovalent cations and preferably sodium.

The polymers obtained from this radiation polymerization have relatively low Huggins constants. This constant is related to the linearity of the polymer where molecular weights are constant, i.e., for two copolymers having similar molecular weights, but different Huggins constant, the lower Huggins constant indicates a more linear polymer. Polymers having Huggins constants below 1 and preferably below 0.7 and more preferably below 0.5 are most often used with this invention. A more detailed definition of Huggins constant and a method for determining the Huggins constant of a polymer is found in "Textbook of Polymer Chemistry," Billmeyer, Interscience Publishers, N.Y., 1957, pp. 128–139.

It is generally desired that the copolymer have a tendency to become entrapped or adsorbed or absorbed within the porous medium, e.g., a reservoir rock. Also, it may be desired that the formation fluids react, e.g., precipitate the polymer, upon coming in contact with the polymer. Linear polymers, i.e., those polymers exhibiting minimum or no branching, are especially useful for displacing back into a reservoir rock before plugging. Also, the anionic property of the copolymer influences the efficiency to plug the porous medium; low anionic content polymers, e.g., down to 15 percent and below, tend to sorb more readily.

Intrinsic viscosity of the polymer can vary from less than about 1 to about 60 dl/g and preferably about 5 to about 35 dl/g. The permeability of the reservoir rock to be treated will greatly influence the desired intrinsic viscosity, but generally speaking, a lower permeability reservoir rock can use lower intrinsic viscosities. For example, permeabilities less than about 50 md can utilize intrinsic viscosities less than about 10, whereas permeabilities of about 200 md or more will generally demand intrinsic viscosities greater than 20. The intrinsic viscosity numbers referred to are measured in a 2 normal sodium chloride at 25.5°C. Of course, the efficiency to "plug" or "bridge" pore holes in reservoir rock increases with increasing intrinsic viscosities; but, increased branching and cross-linking can accomplish the same result. It can be generally concluded that the effectiveness of the polymer increases as the intrinsic viscosity increases. Where the reservoir is characterized by a very high permeability, e.g., in excess of 1 darcy, intrinsic viscosities greater than 25 dl/g and up to 50 dl/g and greater are useful.

The polymer may be solubilized and diluted to the desired concentration with water. The use of water containing high concentration of polyvalent metallic cations which have an adverse effect on the viscosity of the polymer solution or on the water solubility of the polymer is preferably avoided. The concentration of polyvalent metallic cations which may be present in the aqueous polymer solution is dependent upon the specific polyvalent metallic cation present, the temperature and pH of the solution, and the intrinsic viscosity and anionic content of the polymer. In general, the polymer becomes less tolerant of polyvalent metallic cations as the intrinsic viscosity, anionic content, and concentration of the polymer increase. The use of water containing substantial amounts of copper ions and/or iron ions is preferably avoided due to the adverse effect such ions may have on the water-solubility of the polymer. The polymer may be solubilized and diluted to the desired concentration with water. Where maximum viscosity is desired for a given polymer concentration, the water preferably contains less than about 500 ppm of TDS (total dissolved solids). Also, where maximum viscosities are desired, the water preferably contains less than about 50 ppm of divalent cations, such as calcium and/or magnesium, i.e., the water is classified as "soft". Shearing of the polymer upon dissolution and injection into the reservoir should be avoided if maximum viscosity is desired. To obtain maximum viscosity with the gel form of the polymer, the gel is first extruded and then cut into fine pieces, e.g. the size of BBs, and thereafter agitated in an aqueous solution at low shear rates. Pumps characterized by low shear rates as well as agitators run at low shear rates are especially useful. Water-soluble alkaline salts, that is salts which give pH above 7 in water, such as alkali metal carbonates, may be added to the aqueous solution to facilitate solubilization of the polymer. A preferred alkaline salt is sodium carbonate. The amount of alkaline salts added to the water must be carefully controlled if one desires to avoid hydrolysis of the polymer. Other additives known to the art are also useful.

The aqueous polymer solution can contain additives to impart desired characteristics to the process. For example, salts, surfactants, alcohols, pH control, oxygen scavenging agents, corrosion inhibitors, biocides, viscosity stabilizers, solution stabilizers, and other like agents can be incorporated into the aqueous polymer solution. In general, any component can be added to the aqueous polymer solution as long as the component is compatible with the polymer and will not impart an overriding detrimental influence to the polymer during initial saturation of the porous medium.

Desirably, the porous medium is treated with an aqueous polymer solution which is permitted or forced to penetrate the pores. For example, in "plugging" a subterranean reservoir, an aqueous polymer solution is first injected into the area of the reservoir to be plugged. Positioning of an aqueous polymer solution within a subterranean reservoir can be controlled by withdrawing fluids through a disposal well away from the injection well that the aqueous polymer solution is injected through. For example, an aqueous polymer solution can be injected into an injection well and fluids withdrawn from a production well in fluid communication with the same reservoir to position the aqueous polymer solution in the reservoir to be plugged. Where surface porous media are to be plugged, the polymer solution can be sprayed or "floated" onto the porous surface and allowed to penetrate the pores.

After the porous medium has been treated with the polymer, an aqueous complexing agent can be allowed to penetrate the porous medium to complex the polymer and thus form a more permanent plugging effect. Examples of complexing agents useful with the invention include chromic chloride, ferric chloride, aluminum chloride, calcium chloride, and magnesium chloride. An aqueous concentration can contain about 0.0005 to about 1.0 weight percent and more preferably 0.001 to about 0.2 percent and most preferably about 0.002 to about 0.1 percent of the complexing agent that is to precede or follow the agueous polymer solution. A preferred way of improving the plugging efficiency of the aqueous polymers of this invention is to inject into a subsurface reservoir an aqueous polymer solution and thereafter follow it with an aqueous solution containing the complexing agent.

If it is desired to restore the permeability of the porous medium, the porous medium can be treated with chemical agents to chemically degrade or chemically break the bond between the polymer and the porous medium and/or the polymer and the complexing agent. For example, aqueous hydrazine or hypochlorite solutions containing about 0.1 to about 10 percent and preferably about 0.5 to about 8 percent and more preferably about 1 to about 5 weight percent are useful to treat porous media containing the plugging polymer to restore the permeability thereof. Generally speaking, where a hypochlorite solution is used, the concentrations should be greater than in the case where a hydrazine solution is used.

Where it is desired that the polymer readily adsorb onto the porous media, the polymer preferably has an anionic content of above about 0 but lower than about 15 percent. Also, it is preferred that the polymer have a very high molecular weight and/or branching and/or be partially cross-linked with other polymer molecules. For linear-type polymers, the intrinsic viscosity of the polymer tends to correlate with the molecular weight, i.e., higher intrinsic viscosities generally indicate higher molecular weights. However, where there is a high degree of branching on the polymer molecule, then such a relationship may not be valid.

To obtain polymers having intrinsic viscosities above 30 dl/g, it is preferred that the radiation intensity be within the range of about 5,000 to about 50,000 rads/hr, and the monomer concentration be within the range of about 20 to about 60 percent, more preferably 25 percent to 50 percent. Also, it is preferred that the conversion of the monomer be below 75 percent and preferably below 60 percent. In summary, to obtain highest molecular weight polymers, it is preferred that relatively low radiation intensities be used, that high monomer concentrations be present, and that low conversion of monomer to polymer be obtained.

Also, improved plugging of porous media can be effected by using branched or partially cross-linked polymer. This can be accomplished by over-irradiating the aqueous polymer solution. For example, after 100% conversion of the monomer to polymer is effected, then continuous radiation of the polymer solution tends to cross-link the polymer. However, the water solubility of the resulting cross-linked polymer tends to decrease--thus, the degree of cross-linking should be controlled to insure that a completely water-insoluble polymer is not obtained. It is intended that water solubility as used within this invention include those polymers which have at least sufficient hydrophilicy to remain dispersed within the aqueous polymer solution. Also, cross-linking can be effected by using difunctional agents within the aqueous monomer solution to be irradiated. These difunctional agents should contain at least two ethylenical double bonds and be copolymerizable and water-soluble. Examples of such agents include methylene bis-acrylamide, sorbitol polyacrylate, hexyl allyl ether sorbitol, and like compounds.

"Plugging" as used herein includes temporarily as well as permanently reducing the permeability of a porous medium. The porous medium can be a surface medium or a subsurface medium. Thus, a plugging agent is meant to be synonymous with a temporary diverting agent as well as a permanent diverting agent.

Generally speaking, aqueous polymer solutions containing about 10 to about 10,000 ppm and preferably about 50 to about 2,000 and more preferably about 100 to about 1,000 ppm of the polymer are generally effective to plug porous media. Of course, higher concentrations are useful if the desired application requires same. Also, other components known in the art can be added to the aqueous polymer solution to impart desired plugging characteristics.

The following examples are presented to teach specific working embodiments of the invention; such are not meant to limit the interpretation of the invention. Unless otherwise specified, all percents are based on volume.

PREPARATION OF THE COPOLYMERS

Polymers used for testing are prepared with Cobalt 60 gamma radiation; radiation intensities and dosages are outlined in Table 1. The process for preparing Polymer A is explained; preparation of the other polymers is similar except for variations indicated in Table 1.

To 24,000 gms of deionized water there are added 692 gms of sodium hydroxide. After cooling the solution to 30°C, 1,250 gms of acrylic acid are added. Thereafter, 5,000 gms of acrylamide are added while mixing and the pH is adjusted to 9.4. The resulting solution contains 75 percent by weight acrylamide (AAd) and 25 percent by weight sodium acrylate (NaAA) and has a total monomer concentration of 21.4 percent by weight. The solution is purged with $N_2$ for 20 minutes and thereafter sealed. The sample is irradiated with Cobalt 60 gamma radiation at an intensity of 18,000 rads/hr. (R/hr.) to a total dose of 8,800 rads (R). The resulting product is a gel-like mass.

A portion of the gel is weighed, and thereafter extracted with methanol to precipitate the polymer. The polymer is dried in a vacuum oven at 36°C and 0.02 psi for 24 hours and then to constant weight at 110°C. Weight of the dried product divided by the theoretical weight gives a monomer conversion of 93 percent.

A portion of the gel is solubilized in water by first extruding it through a "meat" grinder; the "spaghetti"-like extrusion is cut into "BB" size particles and then dissolved in water by agitating at a low rpm to prevent substantial shearing of the polymer.

The residue of the gel is produced in dry powder form by first extruding the gel, then dissolving it in water and thereafter adding methanol to precipitate the polymer out of the solution. The polymer is then ground to less than 20-mesh size and finally dried at 60°C in a vacuum oven.

The intrinsic viscosity is measured at 25.5°C in a 2 normal NaCl aqueous solution. The Huggins constant is measured by the method described in "Textbook of Polymer Chemistry," Billmeyer, Interscience Publishers, New York, 1957, pp. 128-139.

The monomer used in Sample "G" is dissolved in water containing 9.1 percent by weight of methanol.

Runs 1 through 6, as compared to Runs 7-9, exhibit more effective plugging.

Table 1

INFORMATION ON POLYMER SAMPLES

| Polymer | AAd/NaAA Wt. Ratio | Monomer Concentration(%) | pH | Intensity (R/hr.) | Total Dose (R) | Additive (%) | Monomer Conversion (%) | Intrinsic Viscosity Gel (dl/g) | Intrinsic Viscosity Powder (dl/g) | Huggins Constants Gel | Huggins Constants Powder |
|---|---|---|---|---|---|---|---|---|---|---|---|
| A | 75/25 | 21 | 9.4 | 18,000 | 8,800 | — | 93 | 23.7 | 23.0 | — | 0.19 |
| B | 70/30 | 21 | 9.4 | 20,000 | 9,800 | — | 93 | 22 | 20 | 0.19 | 0.19 |
| C | 60/40 | 22 | 9.4 | 20,000 | 10,300 | — | 93 | 23.0 | 23.0 | — | — |
| D | 70/30 | 30 | 9.5 | 230,000 | 50,000 | — | 91 | 14 | 12.8 | — | 0.38 |
| E | 70/30 | 40 | 9.5 | 10,000 | 1,760 | — | 34 | 39.4 | 33 | 0.06 | — |
| F | 70/30 | 24 | 9.5 | 100,000 | 15,000 | — | 86 | 18.5 | — | 0.24 | — |
| G | 70/30 | 27 | 9.5 | 20,000 | 11,500 | MeOH 9.1 | 91 | 12.4 | 11.7 | 0.31 | 0.38 |
| H | 70/30 | 13 | 9.5 | 220,000 | 44,000 | MeOH 15 | 96.5 | 1.0 | — | — | — |
| I | 70/30 | 13 | 9.5 | 220,000 | 44,000 | — | 96.5 | 5.8 | — | 0.64 | — |
| J | 70/30 | 25 | 9.5 | 220,000 | 44,000 | MeOH 15 | 84.0 | 6.9 | — | 0.52 | — |
| K | 70/30 | 24 | 9.5 | 20,000 | 7,660 | — | 86.7 | 28.2 | — | 0.13 | — |
| L | 70/30 | 30 | 9.5 | 20,000 | 2,667 | — | 54 | 31.0 | — | 0.04 | — |
| M | 90/10 | 40 | 9.6 | 10,000 | 1,350 | — | 24 | 53 | — | Less than 0.02 | — |

EXAMPLE I

To show that the copolymers of this invention give improved plugging properties, this example is presented.

Core samples taken from a sandstone formation are first flushed with toluene, then dried in a vacuum. Permeability of the cores is between 100 and 200 md. The cores are then encapsulated in plastic, except for the ends. The polymers are dissolved in water containing Table 2-indicated TDS and are then passed through a 200-mesh screen to remove any large particles. They are then injected into the cores. The initial and flushed permeabilities are measured with water containing about 500 ppm TDS. High permeability reductions are desired to obtain improved plugging. The front section permeability reduction simulates treatment of a surface porous medium while the back section permeability reduction simulates a subsurface porous medium treatment (i.e., treatment of a porous rock away from the face of the rock).

It is not intended that the invention be limited by the above example. Rather, all equivalents obvious to those skilled in the art are intended to be included within the scope of the invention as defined in the specification and appended claims.

What is claimed is:

1. A process of "plugging" porous medium to the flow of fluids, the process comprising treating the porous medium with water comprised of sufficient amounts of a polymer having sufficient property to at least substantially reduce the permeability to the flow of the fluids through the porous medium, the polymer obtained as a product of radiation polymerization of at least one monomer selected from the group consisting of acrylamide and methacrylamide and at least one monomer selected from the group consisting of acrylic acid, methacrylic acid, alkali metal acrylate, and alkali metal methacrylate in concentrations of about 10 to about 60 percent by weight dissolved monomer in an aqueous medium, the radiation intensity being about

TABLE 2

RESULTS OF POLYMER FLOODING IN 100-200 md SANDSTONE CORES

| Run | Polymer | Brookfield Viscosity at 6 rpm (cp) | Initial Permeability (md) Front | Initial Permeability (md) Rear | Flushed Permeability (md) Front | Flushed Permeability (md) Rear | Permeability Reduction Front | Permeability Reduction Rear |
|---|---|---|---|---|---|---|---|---|
| 1 | A | 26.7 | 107 | 142 | 0.5 | 1.7 | 213 | 82 |
| 2 | B | 32.2 | 142 | 145 | 1.5 | 2.6 | 93 | 56 |
| 3 | C | 27.2 | 132 | 112 | 0.9 | 1.5 | 150 | 78 |
| 4 | D | 20.0 | 110 | 125 | 0.6 | 2.4 | 178 | 52 |
| 5 | B | 8.8 | 159 | 158 | 1.3 | 3.9 | 124 | 41 |
| 6 | B | 7.1 | 97 | 154 | 0.7 | 5.2 | 143 | 30 |
| 7 | Partially hydrolyzed polyacrylamide | 20.1 | 166 | 167 | 12.2 | 20.7 | 14 | 8 |
| 8 | Copolymer No. 1 | 39.0 | 123* | 180 | 2.6 | 3.6 | 47 | 50 |
| 9 | Copolymer No. 2 | 38.5 | 134 | 193 | 5.5 | 11.3 | 24.6 | 17.1 |

Runs 1-4 contain 700 ppm polymer dissolved in water containing about 500 ppm of TDS.
Run 5 contains 300 ppm polymer dissolved in water containing about 500 ppm of TDS.
Run 6 contains 700 ppm polymer dissolved in water containing 18,000-20,000 TDS.
Runs 7-9 contain 800 ppm polymer dissolved in water containing about 500 ppm of TDS.
*Core may have been damaged.
Copolymer No. 1 = a commercially available, anionic acrylamide copolymer obtained by a chemically catalyzed polymerization reaction; has an intrinsic viscosity of 12.5 and a Huggins constant of 0.34.
Copolymer No. 2 = a commercially available, very high molecular weight, strongly anionic copolymer of acrylamide obtained by a chemically catalyzed polymerization reaction; has an intrinsic viscosity of 22.0 and a Huggins constant of 0.18
Partially hydrolyzed polyacrylamide = a commercially available, partially hydrolyzed, high molecular weight polyacrylamide obtained by a chemically catalyzed reaction; has an intrinsic viscosity of 15.1 and a Huggins constant of 0.38.

250 to about 1,000,000 rads/hr, and the radiation dose being about 500 rads to about 300,000 rads.

2. The process of claim 1 wherein one of the monomers is acrylic acid.

3. The process of claim 1 wherein one of the monomers is methacrylic acid.

4. The process of claim 1 wherein one of the monomers is sodium acrylate.

5. The process of claim 1 wherein one of the monomers is sodium methacrylate.

6. The process of claim 1 wherein one of the monomers is acrylamide.

7. The process of claim 1 wherein the polymer is a copolymer obtained by copolymerizing acrylamide and sodium acrylate.

8. The process of claim 1 wherein the radiation intensity is within the range of about 1,000 to about 300,000 rads/hr.

9. The process of claim 1 wherein the radiation dose is within the range of about 1,000 to about 100,000 rads.

10. The process of claim 1 wherein the pH of the aqueous medium is within the range of about 3 to about 13.

11. The process of claim 1 wherein the pH of the aqueous medium is within the range of about 8 to about 11.

12. The process of claim 1 wherein the porous medium is within a subterranean formation.

13. The process of claim 1 wherein the permeability of the porous medium is restored by treating the porous medium with an aqueous solution containing hydrazine or hypochlorite.

14. The process of claim 1 wherein the porous medium is treated with an aqueous solution containing chromic chloride or ferric chloride before or after the porous medium is contacted with the aqueous polymer solution.

15. The process of claim 1 wherein the water contains about 10 to about 10,000 ppm of the polymer.

16. A process of "plugging" a porous medium within a subterranean formation having an injection means in fluid communication therewith, the process comprising injecting into at least a portion of the porous medium an aqueous solution comprised of about 10 to about 10,000 ppm of a polymer obtained as a product of radiation polymerization of an aqueous solution comprised of about 10 to about 60 percent by weight of a mixture of about 25 to about 99 percent acrylamide and about 75 to about 10 percent sodium acrylate, the radiation intensity being within the range of about 5,000 to about 200,000 rads/hr and the radiation dose being within the range of about 1,500 rads to about 50,000 rads and the polymer having sufficient property to "plug" the porous medium.

17. The process of claim 16 wherein the copolymer obtained from the radiation polymerization is in the form of a gel.

18. The process of claim 16 wherein the aqueous solution contains 15 to about 55 percent by weight of sodium acrylate.

19. The process of claim 16 wherein the radiation is gamma radiation.

20. The process of claim 16 wherein an aqueous solution containing chromic chloride or ferric chloride is injected into the porous medium after the aqueous polymer solution to complex the polymer in situ of the porous medium.

21. The process of claim 16 wherein permeability of the porous medium is restored by treating the porous medium with an aqueous solution containing hydrazine or hypochlorite.

* * * * *